UNITED STATES PATENT OFFICE.

JOHN D. FLETCHER, OF EVANSVILLE, INDIANA.

COFFEE COMPOUND.

1,255,816.  Specification of Letters Patent.  Patented Feb. 5, 1918.

No Drawing.  Application filed May 21, 1917. Serial No. 170,042.

*To all whom it may concern:*

Be it known that I, JOHN D. FLETCHER, a citizen of the United States, residing at Evansville, Vanderburg county, and State of Indiana, have invented and discovered certain new and useful Improvements in Coffee Compounds, of which the following is a specification.

My said invention consists in a compound designed for the purpose of making a beverage possessing the flavor and effect of coffee. It consists in the combination of the following ingredients: caffeine, derived from any suitable source; crystallized caramel; fluid extract of the coffee bean; and, if desired, malted milk, and powdered or granulated sugar.

The essential ingredients of the combination are caffeine in the proportion of one to two grains to each tablet or tablespoonful of the compound, a sufficient amount of crystallized caramel to furnish the body, and a sufficient amount of the fluid extract of the genuine coffee bean to furnish the flavor. The caffeine provides the stimulating effect of the coffee; the caramel, the body and a certain amount of flavoring; and the fluid extract, the flavor. The proportions may be varied to suit different tastes. The malted milk and sugar, either one or both, are added where tablets, or the compound in powdered form, are desired to suit the tastes of persons desiring sugar and cream, or either one, in their coffee.

The ingredients are combined and mixed together, and put up in either powdered form or in tablets, contained in suitable cans or other containers; and when in tablet form, the tablets are so proportioned that one tablet is intended to serve to make one cup of coffee. In powdered form, one to two teaspoonfuls are required to each cup.

It is understood, of course, that the tablets are formed by any well-known or appropriate process, and that the ingredients specified are combined in any well-known or desired manner.

The compound is used by placing the required amount in a quantity of hot water, mixing until dissolved, which requires but a moment, when the beverage is ready to serve.

Having thus fully described my said invention, what I claim as new and desire to secure by Letters Patent is:—

1. A coffee compound composed of caffeine, caramel, and fluid extract of the coffee bean, substantially in the proportions specified.

2. A coffee compound comprising caramel, caffeine, and fluid extract of the genuine coffee bean, combined with malted milk.

3. A coffee compound comprising caramel, caffeine, and fluid extract of the genuine coffee bean, combined with sugar.

4. A coffee compound comprising caramel, caffeine, and fluid extract of the genuine coffee bean, combined with malted milk and sugar.

In witness whereof, I have hereunto set my hand and seal at Washington, District of Columbia, this nineteenth day of May, A. D. nineteen hundred and seventeen.

JOHN D. FLETCHER. [L. S.]

Witnesses:
E. W. BRADFORD,
E. S. CLEMENTS.